US009150800B2

(12) United States Patent
Liu et al.

(10) Patent No.: US 9,150,800 B2
(45) Date of Patent: Oct. 6, 2015

(54) SECOND STAGE GASIFIER IN STAGED GASIFICATION AND INTEGRATED PROCESS

(71) Applicant: Southern Company, Birmingham, AL (US)

(72) Inventors: Guohai Liu, Birmingham, AL (US); Pannalal Vimalchand, Birmingham, AL (US); WanWang Peng, Birmingham, AL (US)

(73) Assignee: SOUTHERN COMPANY, Birmingham, AL (US)

( * ) Notice: Subject to any disclaimer, the term of this patent is extended or adjusted under 35 U.S.C. 154(b) by 10 days.

(21) Appl. No.: 14/102,327

(22) Filed: Dec. 10, 2013

(65) Prior Publication Data

US 2014/0158941 A1    Jun. 12, 2014

Related U.S. Application Data

(60) Provisional application No. 61/735,134, filed on Dec. 10, 2012.

(51) Int. Cl.
| | |
|---|---|
| *C10K 3/02* | (2006.01) |
| *C10J 3/48* | (2006.01) |
| *C10J 3/72* | (2006.01) |

(52) U.S. Cl.
CPC .................. *C10J 3/482* (2013.01); *C10J 3/721* (2013.01); *C10J 2300/093* (2013.01);
(Continued)

(58) Field of Classification Search
CPC .......... C10J 3/46; C10J 3/54; C10J 2300/093; C10J 2300/0956; C10J 3/482; C10J 2300/0976; C10J 2300/1807; C10J 3/721; C10J 2300/0993; Y02E 20/18; C10K 3/02
USPC ......................................... 48/197 R; 252/373
See application file for complete search history.

(56) References Cited

U.S. PATENT DOCUMENTS

| | | | | | |
|---|---|---|---|---|---|
| 2,620,348 | A | * | 12/1952 | May et al. ...................... | 518/702 |
| 2,623,815 | A | * | 12/1952 | Roetheli et al. ................... | 48/73 |

(Continued)

FOREIGN PATENT DOCUMENTS

| | | |
|---|---|---|
| WO | 2011097584 A1 | 8/2011 |
| WO | WO 2011097584 A1 * | 8/2011 |

OTHER PUBLICATIONS

International Search Report; PCT/US13/74063; Apr. 8, 2014; Prepared by Shane Thomas.

*Primary Examiner* — Colleen Dunn
*Assistant Examiner* — Syed Iqbal
(74) *Attorney, Agent, or Firm* — Troutman Sanders LLP; Ryan A. Schneider; Dustin B. Weeks

(57) ABSTRACT

A second stage gasification unit in a staged gasification integrated process flow scheme and operating methods are disclosed to gasify a wide range of low reactivity fuels. The inclusion of second stage gasification unit operating at high temperatures closer to ash fusion temperatures in the bed provides sufficient flexibility in unit configurations, operating conditions and methods to achieve an overall carbon conversion of over 95% for low reactivity materials such as bituminous and anthracite coals, petroleum residues and coke. The second stage gasification unit includes a stationary fluidized bed gasifier operating with a sufficiently turbulent bed of predefined inert bed material with lean char carbon content. The second stage gasifier fluidized bed is operated at relatively high temperatures up to 1400° C. Steam and oxidant mixture can be injected to further increase the freeboard region operating temperature in the range of approximately from 50 to 100° C. above the bed temperature.

62 Claims, 5 Drawing Sheets

(52) U.S. Cl.
CPC . *C10J 2300/0956* (2013.01); *C10J 2300/0976* (2013.01); *C10J 2300/0993* (2013.01); *C10J 2300/1807* (2013.01); *Y02E 20/18* (2013.01)

(56) References Cited

U.S. PATENT DOCUMENTS

| | | | | |
|---|---|---|---|---|
| 2,633,416 | A | * | 3/1953 | Gornowski et al. ............. 48/203 |
| 4,013,428 | A | * | 3/1977 | Babbitt ............................ 48/202 |
| 4,309,270 | A | * | 1/1982 | Tyler et al. ....................... 201/10 |
| 5,145,826 | A | * | 9/1992 | Hirschberg et al. ............ 502/262 |
| 5,236,470 | A | * | 8/1993 | Levin ................................ 48/210 |
| 6,955,695 | B2 | * | 10/2005 | Nahas ........................... 48/197 R |
| 8,088,832 | B2 | * | 1/2012 | Melnichuk et al. ............ 518/700 |
| 8,268,899 | B2 | | 9/2012 | Robinson |
| 2010/0096594 | A1 | * | 4/2010 | Dahlin et al. .................. 252/372 |
| 2010/0281878 | A1 | * | 11/2010 | Wormser ......................... 60/781 |
| 2011/0146152 | A1 | * | 6/2011 | Vimalchand et al. ............. 48/61 |
| 2011/0308155 | A1 | * | 12/2011 | Paskach et al. .................... 48/77 |
| 2012/0294775 | A1 | | 11/2012 | Tsang |

* cited by examiner

SECOND STAGE GASIFIER IN STAGED GASIFICATION AND INTEGRATED PROCESS

CROSS-REFERENCE TO RELATED APPLICATIONS

This application claims the benefit of U.S. Provisional Application No. 61/735,134 filed 10 Dec. 2012, the entire contents and substance of which are hereby incorporated by reference.

STATEMENT REGARDING FEDERALLY SPONSORED RESEARCH OR DEVELOPMENT

This invention was made with Government support under Agreement/Contract Number DE-NT0000749, awarded by the United States Department of Energy. The Government has certain rights in the invention.

BACKGROUND OF THE INVENTION

1. Field of the Invention

The present invention relates generally to a process, apparatus and method to facilitate gasification of various carbonaceous fuels including low reactivity coals in fluidized beds. The invention can handle fuels containing higher percentages of ash and fouling components such as iron, sodium or potassium. More particularly, the present invention relates to a second stage gasification unit in a staged fluidized bed gasification process, which process can gasify nearly all carbonaceous materials and achieve high carbon conversions and produce a tar free and dust free synthesis gas (syngas) with lower concentrations of polluting components than is capable with the conventional process that includes a multistage fluidized bed syngas cooler, a low temperature cyclone and a barrier filter.

2. Description of Related Art

Gasification technology is an effective process to effectively convert carbonaceous resources such as different grades of coal, petroleum residues and cokes into syngas. The syngas can be used in many applications, including downstream chemical synthesis, generating power via its combustion in an IGCC processes producing nearly zero emissions of pollutants as well as effectively capturing carbon dioxide, and/or producing hydrogen by shifting it for utilization in oil refining and coal liquefaction processes.

Conventional gasification processes have substantial limitations in processing wide varieties of carbonaceous resources. For example, entrained flow gasifiers are not suitable economically to process low reactivity fuels that have characteristics such as high ash content or high ash fusion temperatures. Fluidized bed gasifiers are normally designed for low ranks such as lignite and sub-bituminous coals due to their high reactivities. They have difficulties in gasifying high rank coals such as bituminous and anthracite with high carbon conversions. Further, the fluidized bed gasifiers can generate tar and have high methane content in the syngas, both of which significantly decreases syngas utilization to synthesize chemical products by downstream processes. Both the low carbon conversion and formation of tar and methane in the syngas are highly negative performance factors for a fluidized bed gasifier when gasifying high rank coals and other low reactivity fuels.

The fundamental reason for the limitations of fluidized bed gasifiers is that the process must avoid clinker and agglomerate (collectively sometimes referred to herein as "clinkers") formation in the gasifier. Once formed, clinkers can debilitate the gasifier in a very short time and lead to a long outage. To avoid clinker formation, the gasifier operating temperature must be substantially lower than the ash initial deformation temperature because the particle surface temperature is substantially higher than the overall bulk temperature due to partial oxidation on the char particle surface. Making things worse is the fact that the bed carbon content is much higher when gasifying high rank coals due to the low reactivity of the coal. The oxidant (air, enriched air or oxygen) injected into the gasifier will be immediately consumed in a small volume space and create local hot spots favoring clinker formation. Therefore, when a fluidized bed gasifier is used to gasify a bituminous coal, the operating temperature is much lower than the ash initial deformation temperature. Such low operating temperatures in conjunction with the coal's low reactivity leads to lower carbon conversion, tar formation and higher methane content in the syngas.

One way to avoid the conventional limitations of the fluidized bed gasifier is by utilizing a stage-wise approach. For example, the Ebara Process disclosed in U.S. Pat. No. 6,063,355 teaches a two-stage approach to generate syngas from various types of waste refuse. The Ebara Process has a first stage fluidized bed gasifier operating at much lower temperature than a second stage conventional entrained flow gasifier with a burner, and has a relatively low capacity. The Ebara Process, with relatively low capacities in the 100 to 300 tons/day range, has a first stage fluidized bed gasifier operating at around 580° C., and the second stage entrained flow gasifier operating at around 1300° C. In this manner, the stage-wise Ebara Process essentially gasifies waste fuel at the low first stage temperature, which minimizes fuel feed related problems and provides favorable conditions for recovering useful wastes from the bottom of the fluidized bed gasifier. In the second stage, the Ebara Process further conditions the unconverted char, tar and organics in the syngas from the first stage.

However, the Ebara Process cannot efficiently process bituminous coals and other low reactivity fuels with high ash content just as other entrained flow gasifiers, since the second stage gasifier operates with the same disadvantages described with the conventional entrained flow gasifiers—it requires much higher temperatures and oxygen consumption, and thus provides a shorter refractory lifespan—which are in addition to the well-known grey water and black water problems.

Moreover, it is well-known that the mixing effect is very poor in entrained flow gasifiers such as in the second stage gasifier used in the Ebara Process, especially when the gas phase carries quite a low concentration of dust. One example of poor mixing and reaction extent is the freeboard region of a fluidized bed gasifier. In spite of relatively long residence times, limited degrees of chemical reactions occur in the freeboard region of the fluidized bed reactor. A majority of reactions occur in the dense fluidized bed region of the reactor. The same can be said for the entrained flow gasifier. With the increase in size of the gasifier for larger throughputs, poor mixing between the gas and solids results, with progressive deterioration in carbon conversion.

The effect of poor mixing is much more prominent with the second stage gasifier of Ebara Process than with a conventional entrained flow gasifier in which both coal and oxygen are concentrated in the highest temperature burner tip region. Only a small fraction of fuel particles escapes the flame region, and thus never gets another chance for conversion. In contrast, the char particles and the tar vapors tend to accumulate in the relatively lower temperature wall region due to the poor mixing of the swirling-type second stage entrained flow gasifier of the Ebara Process. Abnormally higher temperature at the oxygen injection region can increase the overall temperature in the second stage gasifier of the Ebara Process at the expense of increased oxygen consumption and shorter refractory lifespan.

Other methods to avoid the conventional limitations of the fluidized bed gasifier have been proposed that essentially act as a second stage gasifier. One such example is disclosed in U.S. Pat. No. 4,412,848 that teaches a method of injecting oxygen at a lower inlet section of a second stage cooler, where the operating temperature is about 400-500° C. U.S. Pat. No. 4,412,848 purports to reduce the tar deposition on the heat transfer media particle surfaces. Except for the inlet section, the overall cooler bed temperature is only about 250-300° C., which is below the ignition temperature of syngas components (carbon monoxide, hydrogen and others), raising a significant safety concern. Further, such a low temperature partial oxidation does not appreciably improve carbon conversion. For low reactivity coals, the carbon conversion in the first stage gasifier, if operated at about 1000° C. to limit/avoid clinker formation, will be less than 80%, and therefore the second stage must operate at much higher temperatures to increase the carbon conversion.

Another attempt to improve conversion of char particles and tar in the syngas stream is to directly inject oxygen to the freeboard region just above the fluidized bed gasifier, see, for example, http://www.fischer-tropsch.org/primary_documents/gvt_reports/BIOS/333/BIOS_333_toc.htm, as has been practiced in the known Winkler gasifier since 1930s. Since oxygen is directly injected into the gasifier to increase the freeboard temperature, the cost of implementation is low. However, overall mixing and temperature uniformity in the vessel with gas flows carrying only up to 40,000 part per million by weight (ppmw) dust is poor. In spite of improvements, the effect of oxygen injection to the Winkler gasifier freeboard region still results in low carbon conversions.

U.S. patent application Ser. No. 13/936,457, hereby incorporated by reference, discloses a two-stage gasification process to efficiently gasify high ash bituminous and semi-anthracite coals and other low reactivity fuels with over 95% carbon conversion and the generation of tar-free syngas for further processing. To convert carbon sources with low reactivity, the second stage fluidized bed gasification unit needs to operate at temperatures in the range of 1100-1400° C. At these high gasifier exit temperatures, costs associated with cooling the syngas effectively and efficiently become a challenge. U.S. patent application Ser. No. 14/010,381, hereby incorporated by reference, presents an apparatus and method to cool high temperature syngas in a multistage circulating fluidized bed syngas cooler.

The potential beneficial utilization of the combination of these two innovative systems, along with a conventional barrier filter, still poses challenges in configuring and operating a gasification process to gasify a wider variety of carbon sources.

To overcome the operability, efficiency and cost issues mentioned above, an integrated and staged gasification process that can gasify various carbonaceous materials is highly desirable. It is the intention of the present invention to provide for such an industrial need.

BRIEF SUMMARY OF THE INVENTION

Briefly described, in a preferred form, the present invention comprises a high temperature second stage gasification unit that facilitates a cost effective and energy efficient integrated and staged gasification process that can gasify various carbonaceous materials such as coals, petroleum coke, refinery residues, and city waste.

In an exemplary embodiment, the present invention is a second stage gasification unit useful with an integrated gasification process for low reactivity fuels having a first stage gasification unit forming a first stage syngas stream containing unwanted species in a first stage concentration, the second stage gasification unit comprising a high temperature second stage turbulent fluidized bed gasifier having operating characteristics to promote conversion of a first stage syngas stream containing unwanted species in a first stage concentration into a second stage syngas stream containing the unwanted species in a second stage concentration, the second stage concentration of the unwanted species lower than the first stage concentration of the unwanted species, the second stage turbulent fluidized bed gasifier comprising bed material in a bed material region, a freeboard region above the bed material region, and an outlet for the second stage syngas stream containing the unwanted species in the second stage concentration, a syngas temperament device (STD) to temper the second stage syngas stream temperature containing the unwanted species in the second stage concentration, and a bed material return to return at least a portion of bed material from the second stage turbulent fluidized bed gasifier flowing through the STD to the second stage turbulent fluidized bed gasifier, wherein a first operating characteristic of the second stage gasifier is that it operates in the range of approximately 1100 to 1400° C. to achieve an overall carbon conversion of over 95% and produce the second stage syngas stream from low reactivity fuels.

A second operating characteristic of the second stage gasifier can be that it operates with a gas superficial velocity range between approximately 3 to 12 ft/s, and a third operating characteristic of the second stage gasifier can be that it operates within a pressure range between approximately 30 to 1000 psia.

The design of the second stage gasifier so it can operate with the operating characteristics help achieve an overall carbon conversion of over 95% and produce both a tar-free and dust-free second stage syngas stream from low reactivity fuels.

The second stage turbulent fluidized bed gasifier can have syngas inlets in the bed material region of the second stage turbulent fluidized bed gasifier for introduction of the first stage syngas stream to the second stage turbulent fluidized bed gasifier, the first stage syngas stream entering the second stage turbulent fluidized bed gasifier tangentially at different elevations to form a well-mixed turbulent fluidized bed distributing the first stage syngas stream containing the unwanted species in the first stage concentration among the bed material of the second stage turbulent fluidized bed gasifier. The second stage turbulent fluidized bed gasifier can have oxidant and steam mixture stream inlets in the bed material region of the second stage turbulent fluidized bed gasifier for introduction of an oxidant and steam mixture stream. The second stage turbulent fluidized bed gasifier can have oxidant and steam mixture stream inlets in the freeboard region of the second stage turbulent fluidized bed gasifier for introduction of an oxidant and steam mixture stream.

The second stage gasification unit can further comprise a distributor assembly embedded in a refractory layer of the bed material region of the second stage turbulent fluidized bed gasifier for introduction of an oxidant and steam mixture stream.

The height of the bed material region can be in the range of approximately 10 to 15 feet, and the height of the freeboard region can be in the range of approximately 10 to 20 feet.

The second stage turbulent fluidized bed gasifier can have at least one sorbent inlet in the freeboard region of the second stage turbulent fluidized bed gasifier for introduction of one or more sorbents to minimize fouling problems associated with certain ash minerals.

The bed material return can comprise a cyclone, a dipleg, and an L-leg mechanism.

The bed material can comprise inert particles having a size range of approximately 100 to 200 microns.

In another exemplary embodiment, the present invention is a process of conditioning a first stage syngas stream containing unwanted species in a first stage concentration formed by a first stage gasification unit of an integrated gasification process for low reactivity fuels, the process comprising converting the first stage syngas stream containing the unwanted species in the first stage concentration into a second stage syngas stream containing the unwanted species in a second stage concentration in a high temperature second stage turbulent fluidized bed gasifier having operating characteristics, wherein a first operating characteristic of the second stage gasifier is operating the second stage turbulent fluidized bed gasifier in the range of approximately 1100 to 1400° C., the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species, tempering the second stage syngas stream temperature containing the unwanted species in the second stage concentration in a syngas temperament device (STD), and returning at least a portion of bed material from the second stage turbulent fluidized bed gasifier flowing through the STD to the second stage turbulent fluidized bed gasifier.

The process can achieve over approximately 95% carbon conversion into syngas gasifying carbonaceous materials comprising ash content up to approximately 45 wt %. The process can achieve over approximately 95% carbon conversion into syngas gasifying low reactivity carbonaceous materials. The process can achieve over approximately 98% carbon conversion into syngas gasifying low reactivity bituminous coals. The process can produce a tar-free second stage syngas stream from low reactivity fuels.

The process can further comprise introducing the first stage syngas stream into the second stage turbulent fluidized bed gasifier tangentially at different elevations to form a well-mixed fluidized bed distributing the first stage syngas stream containing the unwanted species in the first stage concentration among the bed material of the second stage turbulent fluidized bed gasifier.

The process can further comprise introducing at least one sorbent in the freeboard region of the second stage turbulent fluidized bed gasifier.

In another exemplary embodiment, the present invention is a process of conditioning a first stage syngas stream containing unwanted species in a first stage concentration formed by a first stage gasification unit of an integrated gasification process for low reactivity fuels, the process comprising converting the first stage syngas stream containing the unwanted species in the first stage concentration into a second stage syngas stream containing the unwanted species in a second stage concentration in a high temperature second stage turbulent fluidized bed gasifier, the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species, operating the high temperature second stage turbulent fluidized bed gasifier in the range of approximately 1100 to 1400° C., operating the high temperature second stage turbulent fluidized bed gasifier with a superficial velocity range of between approximately 3 to 12 ft/s, operating the high temperature second stage turbulent fluidized bed gasifier in the range of between approximately 30 to 1000 psia, tempering the second stage syngas stream temperature containing the unwanted species in the second stage concentration in a syngas temperament device (STD), and returning at least a portion of bed material from the second stage turbulent fluidized bed gasifier flowing through the STD to the second stage turbulent fluidized bed gasifier, wherein the process achieves over approximately 95% carbon conversion into syngas gasifying low reactivity fuels.

In another exemplary embodiment, the present invention is a gasification system for low reactivity carbonaceous fuels with an ash content comprising a first stage gasification unit combining carbonaceous materials and oxidant to produce a first stage syngas stream containing unwanted species in a first stage concentration, a high temperature second stage turbulent fluidized bed gasifier having operating characteristics to promote conversion of the first stage syngas stream containing unwanted species in the first stage concentration into a second stage syngas stream containing the unwanted species in a second stage concentration, the second stage concentration of the unwanted species lower than the first stage concentration of the unwanted species, the second stage turbulent fluidized bed gasifier comprising bed material in a bed material region, a freeboard region above the bed material region, and an outlet for the second stage syngas stream containing the unwanted species in the second stage concentration, a syngas temperament device (STD) to temper the second stage syngas stream temperature containing the unwanted species in the second stage concentration, and a bed material return to return at least a portion of bed material from the second stage turbulent fluidized bed gasifier flowing through the STD to the second stage turbulent fluidized bed gasifier, wherein a first operating characteristic of the second stage gasifier is that it operates in the range of approximately 1100 to 1400° C. to achieve an overall carbon conversion of over 95% and produce the second stage syngas stream from low reactivity fuels.

The unwanted species can comprise char carbon, tar, and ash fines, among others.

In another exemplary embodiment, the present invention is a process for generating syngas from low reactivity fuels comprising combining in a first unit low reactivity fuels and oxidant to produce a first stage syngas stream containing unwanted species in a first stage concentration, converting in a second unit being a second stage turbulent fluidized bed gasifier having bed material the first stage syngas stream containing the unwanted species in the first stage concentration into a second stage syngas stream containing the unwanted species in a second stage concentration, the second stage concentration of the unwanted species lower than the first stage concentration of the unwanted species, operating the second stage turbulent fluidized bed gasifier in the range of approximately 1100 to 1400° C., tempering in a third unit the second stage syngas stream containing the unwanted species in the second stage concentration, and returning at least a portion of bed material flowing through the third unit to the second unit.

The process can achieve over approximately 95% carbon conversion into syngas gasifying carbonaceous materials comprising ash content up to approximately 45 wt %.

The process can achieve over approximately 95% carbon conversion into syngas gasifying carbonaceous materials comprising one or more of anthracite, petroleum coke and refinery residues type fuels.

The process can achieve over approximately 98% carbon conversion into syngas gasifying carbonaceous materials comprising low reactivity bituminous coal type fuels with an oxidant comprising one of air, enriched air and oxygen.

The process can generate up to 600 MWe and comprising a single unit of second stage gasifier of transportable size.

The first stage syngas stream can comprise fine entrained particles in the range of approximately 0 to 50 microns, and upon char carbon conversion in the bed material of the second unit and entrainment of unconverted char carbon and finer ash particles from the bed material into a freeboard region of the second unit, the bed material can contain less than approximately 1 wt %. of char carbon and less than approximately 5 wt %. of fine ash.

The process can further comprise operating the second unit approximately 50° C. to 100° C. below the ash fusion temperature of the ash, having a bed material temperature of up to approximately 1400° C., and preventing agglomerate and clinker formation.

The second stage syngas stream is preferably tar-free and has a methane content in the range of approximately 0.25 to 0.5 mole %.

For low reactivity bituminous coal gasification, the oxygen consumption preferably is low and in the range of 350 to 400 scm per 1000 scm of carbon monoxide and hydrogen produced. Further, the coal consumption preferably is low and in the range of 500 to 550 kg of dry coal per 1000 scm of carbon monoxide and hydrogen produced. Further, the steam consumption preferably is low and in the range of 0.25 to 0.35 steam-to-coal mass ratio, and the lower heating value of the exiting syngas is in the range of 8.5 to 10 MJ/scm.

Thus, it can be seen that the present invention uses a fluidized bed as a second stage gasifier, uses fluidized beds in a process to achieve over 95% carbon conversion with low reactivity fuels, and provides means and methods to operate the second stage fluidized bed at high temperatures. For example, the second stage fluidized bed gasification unit can be operated in the range of approximately up to 1400° C. to achieve over approximately 95% carbon conversion.

To gasify a broad spectrum of carbon sources, the present second stage of a two-stage gasification system needs to be essentially a stationary (as opposed to circulating) turbulent fluidized bed gasifier with operating temperatures in the range of approximately 1100 to 1400° C. To operate a gasifier at such high temperatures without being limited by the ash fusion temperature, the gasifier requires much higher oxygen consumption than does a conventional fluidized bed gasifier that operates at relatively lower temperatures. One consequence of the high oxygen flow rates to the present second stage gasifier is that the surface temperature of the char carbon particles can reach much higher temperatures, above the ash fusion temperature, and create local hot spots. Thus, it becomes important to avoid the hot spots leading to clinker formation. Preferred embodiments of the present invention provide a second stage gasification unit and methods of operating such a unit reliably in an integrated process.

The first stage in the two-stage gasification system of U.S. patent application Ser. No. 13/936,457 operates at relatively low temperatures in the range 800 to 1100° C. depending on the feed carbonaceous material in order to alleviate operational challenges. At such relatively low temperatures, the carbon conversion in the first stage is low. Thus, if the present invention uses such a first stage gasifier, in order to achieve over approximately 95% overall carbon conversion, the second stage gasifier of the present invention needs to gasify a significant amount of char carbon particles and tar from the first stage. As the char carbon particles in the second stage are lighter and fine, any unreacted char carbon particles tend to entrain along with the syngas exiting the second stage. Such entrained fine char carbon particles can be collected effectively downstream and recycled back to the second stage to achieve the beneficial higher carbon conversions.

The present second stage gasification unit overcomes many challenges by operating in an integrated staged gasification process, generating cooler dust- and tar-free syngas. The present invention facilitates gasification of a number of different low reactivity carbonaceous materials in fluidized beds with over approximately 95% overall carbon conversion in a fluidized bed gasification system. Preferably, the operating temperature of the second stage gasifier is solely determined by the necessity to convert more than approximately 95% of the carbon feeding into the gasifier regardless of the ash fusion temperature.

The present invention further comprises methods to process low reactivity fuels in two stages of fluidized bed gasifiers that include a high temperature second stage gasification unit. By integrating the staged gasification units with a fluidized bed syngas cooler, a cold third stage cyclone operating at a syngas cooler exit temperatures in the range of approximately 250 to 400° C., a particulate control device (PCD) with ceramic/sintered metal candle filters, and the capability to recycle solids between various units to increase carbon conversion and maintain solids inventory, a dust- and tar-free syngas can be produced for further downstream processing into chemicals or combusting to generate power.

Due to low temperature operation with low reactivity fuels to avoid hot spots that can lead to clinker formation with high carbon content in the bed, the first stage circulating fluidized bed gasification unit of the present invention produces syngas that invariably contains tar and fine ash and char carbon particles. The syngas flows to the present high temperature second stage fluidized bed gasification unit for further processing.

The gas and bed material are well mixed in a fluidized bed and such mixing in the second stage provides nearly uniform bed temperature. The tar molecules in the syngas are uniformly dispersed in the entire bed volume, contacting another uniformly-dispersed oxygen and steam mixture gas stream, and the bed solid particles provide hot surfaces that facilitate tar cracking.

The fine char particles range in the size from 0 to 50 microns and are well dispersed among the second stage gasifier bed material that is maintained in a turbulent fluidized bed operating regime. As the second stage gasifier operates in the range of approximately 1100 to 1400° C., the char will react with oxygen, steam and carbon dioxide to form useful syngas components.

To achieve over approximately 95% overall carbon conversion, the desired operating temperature can be established with $CO_2$ reactivity tests similar to ASTM D5341-93a prescription. The capability to predict the minimum second stage operating temperature makes it possible to achieve the desired carbon conversion without the need to slag or melt the ash, which minimizes the oxygen consumption in the gasification system. In a preferred embodiment, the present invention has substantial advantages over the conventional entrained flow gasifier where the operating temperature has to be high enough to melt the ash, and the viscosity of the resultant slags has to be less than a certain value (for example 250 Poise). For a desired carbon conversion, the second stage gasifier according to the present invention will operate at a lower temperature than the entrained flow gasifier consuming less oxygen.

In a preferred embodiment, if the operating temperature of the second stage gasifier needs to be (just) above the ash deformation temperature to achieve the desired carbon conversion, such an operation can be realized without forming clinkers in the bed—as only a small fraction of fine ash that enters the gasifier accumulates in the bed. The present invention lets the mixing action in the turbulent fluidized bed coat the melted fine ash particles onto the inert particles of the bed. A fraction of the bed materials periodically will be withdrawn, cooled, and after grinding, a portion of the pulverized solids is recycled back to the bed to maintain the particle size distribution in the desired range.

Due to the relatively high operating temperature of the second stage gasifier, methane and cracked tar fractions in the syngas will also undergo gasification reactions to form carbon monoxide and hydrogen. To prevent soot formation during methane and tar cracking process, as well as to consume any soot that forms, steam along with oxygen can be injected into the bed at different elevations and into the freeboard region of the gasifier. A preferred method of steam and oxygen injection in the freeboard region is tangential as the entrained inert solid particles predominately flow downwards along the wall. The tangential injection into the gas phase presents a much better opportunity to react with the soot attached to the refluxing inert solid particles, thereby further increasing the carbon conversion.

As the fines (char and ash) from the first stage have particle sizes predominantly below 50 microns, these particles cannot accumulate in the second stage gasifier. Due to relatively high internal solids circulation rates inside a turbulent fluidized bed, the ratio of solids circulation rate to the entrained fines rate in the syngas that enters the second stage gasifier is of the order of hundreds, and unreacted fines, mainly fine ash, entrains to the freeboard region. Without ash accumulation, the bed material in the second stage gasifier essentially will be the desired start-up bed material, such as sand, that has a much higher ash fusion temperature (thus avoiding clinker formation) and larger particle size for retention. Also, fine ash particles that become molten will coat on to the inert particles that are all at the same bulk bed temperature.

To attain nearly complete carbon conversion with low reactivity fuels, permissible operating temperatures are the single most important factor among the "three Ts" (temperature, turbulence and time) of coal gasification. However, high temperature operation in a fluidized bed is prone to clinker formation because the burning of char particles have a much higher temperature than the bulk of the solids. This is the main reason conventional fluidized beds operate at a temperature much lower than the ash fusion temperature. In the present invention, the fluidized bed in the second stage gasification unit operates at high temperatures—up to approximately 1400° C.—by working around the high operating temperatures related issues of ash and char in the bed.

The first stage circulating fluidized bed gasifier bed material for a low reactivity bituminous coal typically includes approximately 40% by weight char carbon and approximately 60% by weight coal ash. In the second stage fluidized bed gasifier, the char content in the bed is less than approximately 1% by weight and the fine ash fraction is less than approximately 5% by weight. Both the char carbon and fine ash does not accumulate further in the bed. Due to this low char carbon and fine ash fraction in the bed, the second stage gasifier bed essentially is made up of desired coarse material such as silica sand that has fusion temperatures in the range of approximately 1700° C. Thus, the present invention makes feasible the application of fluidized bed principles to achieve high carbon conversions with low reactivity fuels—a feat that has not yet been accomplished in known industrial practice.

In an exemplary embodiment, the present invention includes a second stage turbulent fluidized bed gasification unit for low reactivity carbonaceous materials operating in a staged gasification integrated process (SGIP) flow scheme that further comprises a first stage circulating fluidized bed transport gasifier, a multistage fluidized bed syngas cooler, a cold cyclone, a PCD, and a char carbon recycle system to return part of the char carbon collected from the cold cyclone to the second stage gasifier.

The second stage turbulent fluidized bed gasification unit in the SGIP flow scheme gasifies low reactivity coals, petroleum coke and refinery residues with high carbon conversions in either air, enriched air or oxygen blown modes of operation.

In a preferred embodiment, a novel gas distribution system is used to distribute oxidant and steam gas mixture into the gasifier. In fluidized bed operation, reliable gas injection and distribution are critical. The assembly of the distributor in a preferred embodiment has a much lower chance of being plugged by second stage gasifier bed materials. Even if it becomes plugged due to an abnormal event, the present distributor assembly can be cleaned while on-line. In a preferred embodiment of the gas distributor assembly, the gas distributor is in communication with a concentric pipe assembly with independent gas supply to each pipe. The gas flow through the inner pipe can be reversed to allow the solid particles to flow through and free-up the nozzle of plugged material.

As the distributor assembly is imbedded in the refractory, the distributor assembly and the injection ports therefrom are protected from the bed materials by the refractory from erosion and overheating. The concentric pipe assembly penetrates the vessel shell as a single nozzle and connects to the gas distributor imbedded in the refractory where the oxidant and steam mixture can be distributed through three or more ports into the fluidized bed. Such an innovative arrangement facilitates distribution of gas through many injection ports with few nozzles penetrating the vessel shell.

The present invention, where it is feasible, can achieve a minimum overall carbon conversion of approximately 95% with anthracite and petroleum coke type fuels, and approximately 98% conversion with low reactivity bituminous coal type fuels. Operating the second stage at high temperatures under fluidized bed principles at pressures in the range of approximately 30 to 1000 psia can enable processing of fuels that contain relatively high amounts of ash, up to approximately 45% by weight, or fouling ash minerals or have high ash fusion temperatures with low oxidant and steam consumptions.

The first stage can be a circulating fluidized bed transport gasifier operating in the range of approximately 800 to 1100° C. that achieves between approximately 60 to 80% carbon conversion depending upon the feed material. The circulating bed material in the first stage gasifier can have a mean size in the range of approximately 80 to 120 microns.

The syngas exiting the first stage gasifier and tangentially entering the second stage gasifier can have a substantial fraction of carbon in the form of tar and entrained char carbon. In addition, the syngas to the second stage can also contain entrained fine ash particles with the char carbon and fine ash particles being in the range of approximately 0 to 50 microns.

The second stage gasification unit comprises a gasifier, a syngas temperament device (STD), a cyclone and its dipleg and an L-leg to recycle the dipleg solids back to the gasifier.

The second stage gasifier can be a turbulent fluidized bed gasifier with additional oxidant and steam injection into a lower part of the bed and in the freeboard region above the bed. The fluidized bed can operate in the range of approximately 50° C. to 100° C. below the ash fusion temperature of the feed material and up to an approximately 1400° C. operating temperature. The freeboard region can operate in the range of approximately 50° C. to 100° C. above the bed temperature. The freeboard region can have sorbents such as limestone, dolomite or kaolin injected to minimize fouling problems associated with certain ash minerals such as iron, sodium and potassium.

The second stage gasifier bed material can be made up of inert solids such as silica sand in the range of approximately 100 to 200 microns. The fines entrained in the syngas that enters the second stage gasifier can either get converted, or passes through the bed material with little accumulation thus minimizing the potential for clinker formation.

The gas superficial velocity in the second stage gasifier can be in the range of approximately 3 to 12 ft/s to maintain the bed in the turbulent flow regime. In order to keep the turbulent fluidized bed dense, the internal solids circulation capacity is maintained at a much higher rate than the solids carrying capacity of the gas exiting the dense bed.

Any fine molten ash droplets entrained in the syngas exiting the second stage gasifier preferably condenses and solidifies on the internally circulating bed material in the STD cooler where the syngas temperature is tempered in the range of approximately 100 to 150° C. below the ash fusion temperature. Fresh make-up bed material is added to the STD cooler and the larger and excess bed material particles are withdrawn and recycled back to gasifier from which larger bed particles are drained and discharged.

The cyclone in the second stage gasification unit can capture the small fraction of bed material that entrains along with the syngas from the second stage gasifier and STD cooler, and the captured solids recycled back to the gasifier. The fine ash and any unreacted char carbon can pass through the cyclone to a downstream syngas cooler. The addition of a cyclone in the second stage gasification unit can reduce the overall height of the second stage gasifier with lower disengagement height requirements.

The syngas in the second stage gasification unit can be cooled in a multistage syngas cooler in the SGIP flow scheme to a temperature in the range of approximately 250 to 400° C. The syngas can flow to a third stage cold cyclone with a higher efficiency due to a lower operating temperature to capture unreacted carbon along with fine ash, and recycle the carbon back to the second stage gasifier to achieve more than approximately 95% overall carbon conversion with hard to convert fuels such as petroleum coke.

The syngas exiting the PCD can be both tar and dust free with low methane content and suitable for downstream chemical synthesis or power generation.

DETAIL DESCRIPTION OF THE INVENTION

Figure 1:
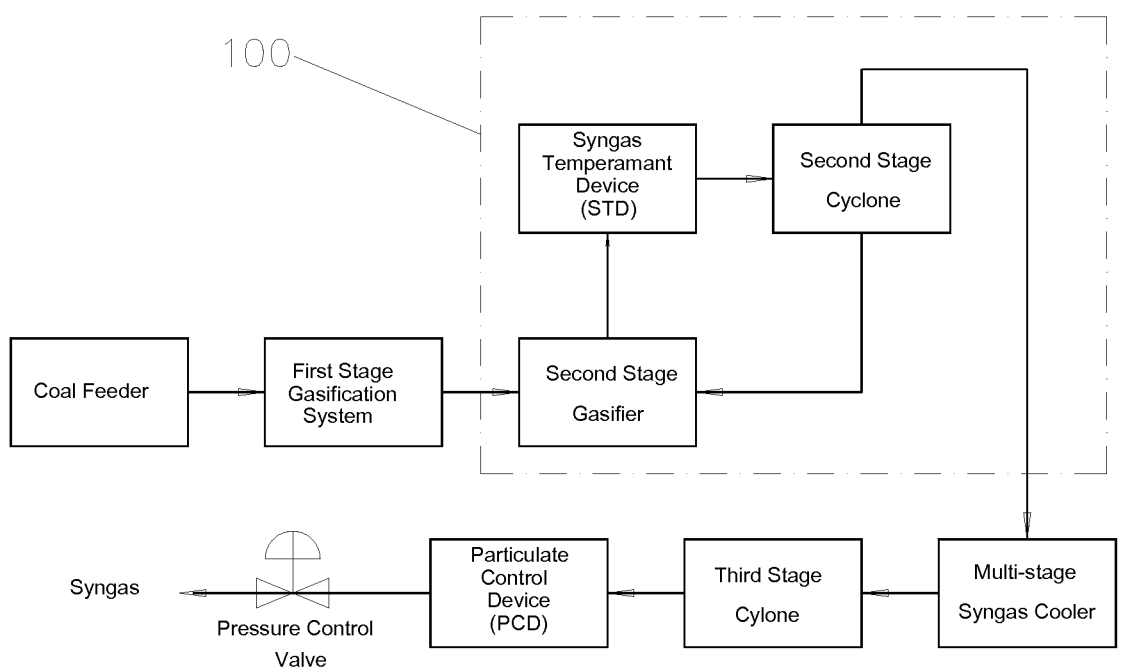
FIG. 1 is a flow diagram of the staged gasification integrated process for gasifying low reactivity and other fuels utilizing a high temperature second stage fluidized bed gasification unit.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

In an exemplary embodiment of the present invention, a second stage gasification unit process, apparatus and operation method to gasify varieties of carbonaceous materials and to produce dust and tar free syngas with a fixed amount of hydrogen sulfide ($H_2S$) in the syngas is disclosed. As used herein, carbonaceous materials, or fuels, include hard-to-process fuels such as coals that have low reactivity with high amounts of ash, high ash fusion temperatures, or fouling ash minerals. For example, the ash content in the coal can be as high as approximately 45% by weight and the ash deformation temperature can range from a low of approximately 1050° C. to higher than approximately 1500° C.

To gasify such fuels, FIG. 1 illustrates a second stage gasification unit 100 in a SGIP flow scheme. In the embodiment presented in FIG. 1, the process, apparatus and methods for integrating the second stage gasification unit in the SGIP flow scheme are described hereinafter for gasifying a low reactivity bituminous coal that may contain significant amounts of a fouling component in the ash mineral. One of skill in the art will recognize that the teachings herein are equally applicable to other carbonaceous fuels with variations in configurations and processing conditions, all within the spirit of the disclosure.

The SGIP implementation includes a first stage transport gasifier comprising a Circulating Fluidized Bed (CFB) gasifier with only a one stage presalter cyclone derived from, for example, the teachings of U.S. Pat. No. 7,771,585 hereby incorporated by reference. The first stage transport gasifier preferably operates at least approximately 120° C. to 150° C. below the ash initial deformation temperature to gasify coals. Depending on the coal, the operating temperature of first stage transport gasifier is generally in the range of approximately 800 to 1100° C. Such low operating temperatures are necessitated in the first stage gasifier to avoid circulating bed material from forming clinkers in the bed.

Low operating temperatures in the first stage lead to a lower carbon conversion in the range of approximately 60 to 80% depending upon the fuel. In the first stage transport gasifier, the feed particle mass mean sizes are preferably in the range of approximately 150 to 300 microns, and the feed particles disintegrate upon rapid heat-up in the gasifier as well as due to the grinding effects of circulation to reach a mass mean size in the range of approximately 80 to 120 microns in the circulating bed. During normal operation, the circulating solids (bed material) are essentially ash material, derived from feed coal. For feed fuels that contain very little ash such as refinery residues, the bed material is made up of inert solid particles such as silica sand or alumina in the range of approximately 80 to 120 microns.

To maintain solids inventory in the first stage, a portion of circulating solids continuously needs to be withdrawn. As disclosed in U.S. patent application Ser. No. 13/936,457, the use of just one cyclone in the first stage and the flexibility of the presalter cyclone performance allow for entrainment of finer particles in the range of approximately 0 to 50 microns along with the syngas that exits the first stage gasifier. With the entrainment of finer particles, any decrease in solids inventory can be made up by addition of cooler solids from the fluidized bed syngas cooler.

Both the first and second stage gasifiers can operate in either an air blown gasification mode for power generation or an oxygen blown gasification mode for downstream chemical synthesis. The process also can operate in an enriched air mode to improve the economics of power generation or to provide appropriate nitrogen to hydrogen ratio in the syngas for ammonia production process.

The oxidant (for example, air, oxygen and/or enriched air) is introduced in a lower part of the first stage transport gasifier riser that is maintained in the range of approximately 12 to 50 ft/s superficial gas velocity depending upon the feed fuel characteristics. Such gas velocities in combination with oxidant distribution at different elevations and operating at lower gasification temperatures in the range of approximately 800 to 1100° C. minimize if not eliminate hot spots that lead to clinker formation and agglomeration in the first stage transport gasifier.

As the coal conversion for low reactivity fuels is kinetically controlled, the overall gasifier height is relatively less and with just one stage cyclone, the capital cost associated with the first stage transport gasifier is much less in a two-stage gasification system than with the CFB gasifiers that process high reactivity fuels in just one stage with multiple cyclones.

Figure 2:
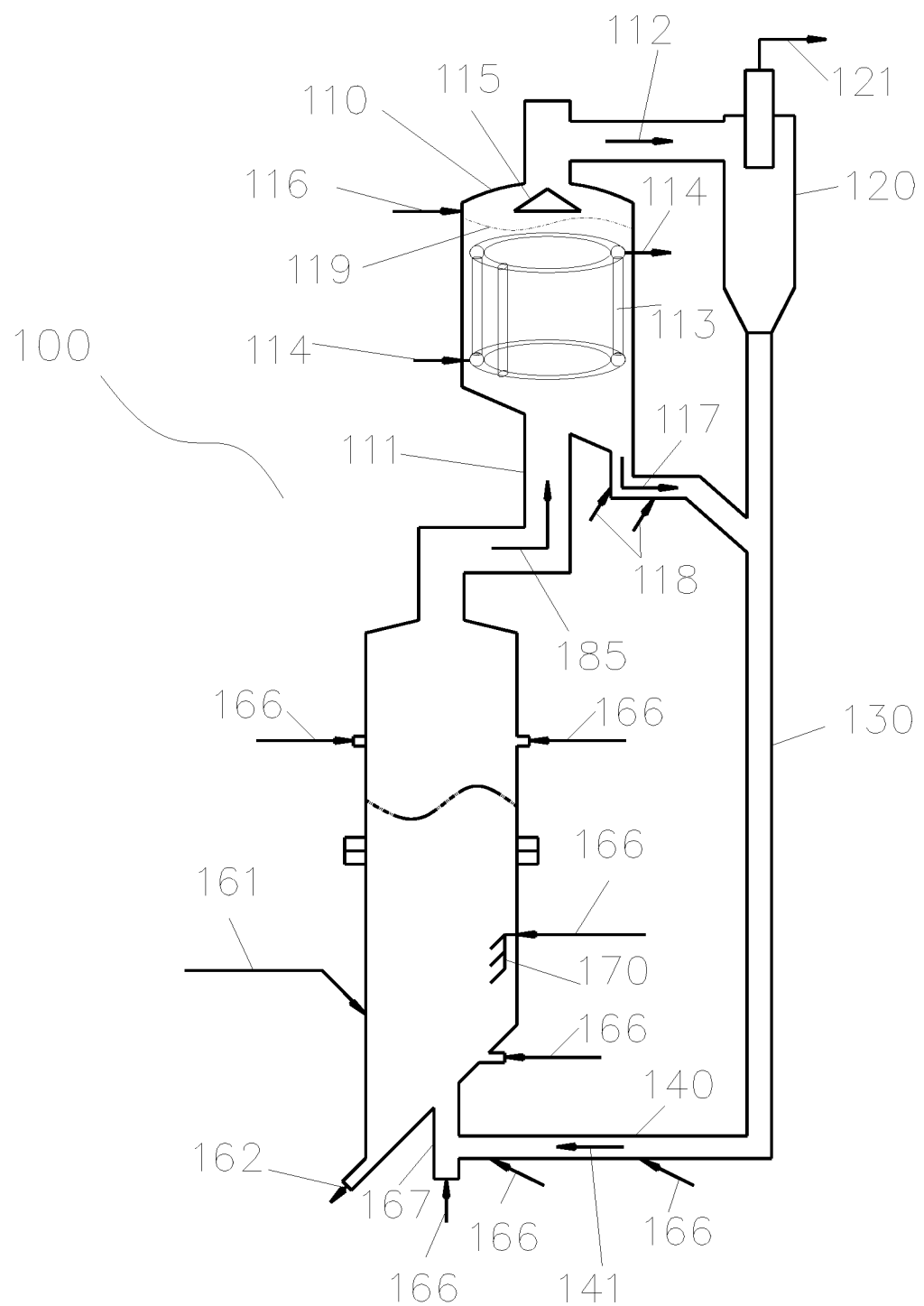
FIG. 2 is a schematic embodiment of second stage gasification unit comprising a syngas temperament device, cyclone, cyclone dipleg and a return leg to recycle solids back to the gasifier.

The syngas exiting the first stage transport gasifier with entrained finer particles that includes unconverted char carbon particles enters a second stage high temperature gasification unit 100 as shown in FIG. 2 that comprises a turbulent fluidized bed second stage gasifier 150 operating in the range of approximately 3 to 12 ft/s superficial gas velocity. The unit 100 further comprises an STD 110, a cyclone 120 and its dipleg 130, and a non-mechanical L-valve 140 to recycle the solids collected by the cyclone back to the second stage gasifier 150.

Figure 3:
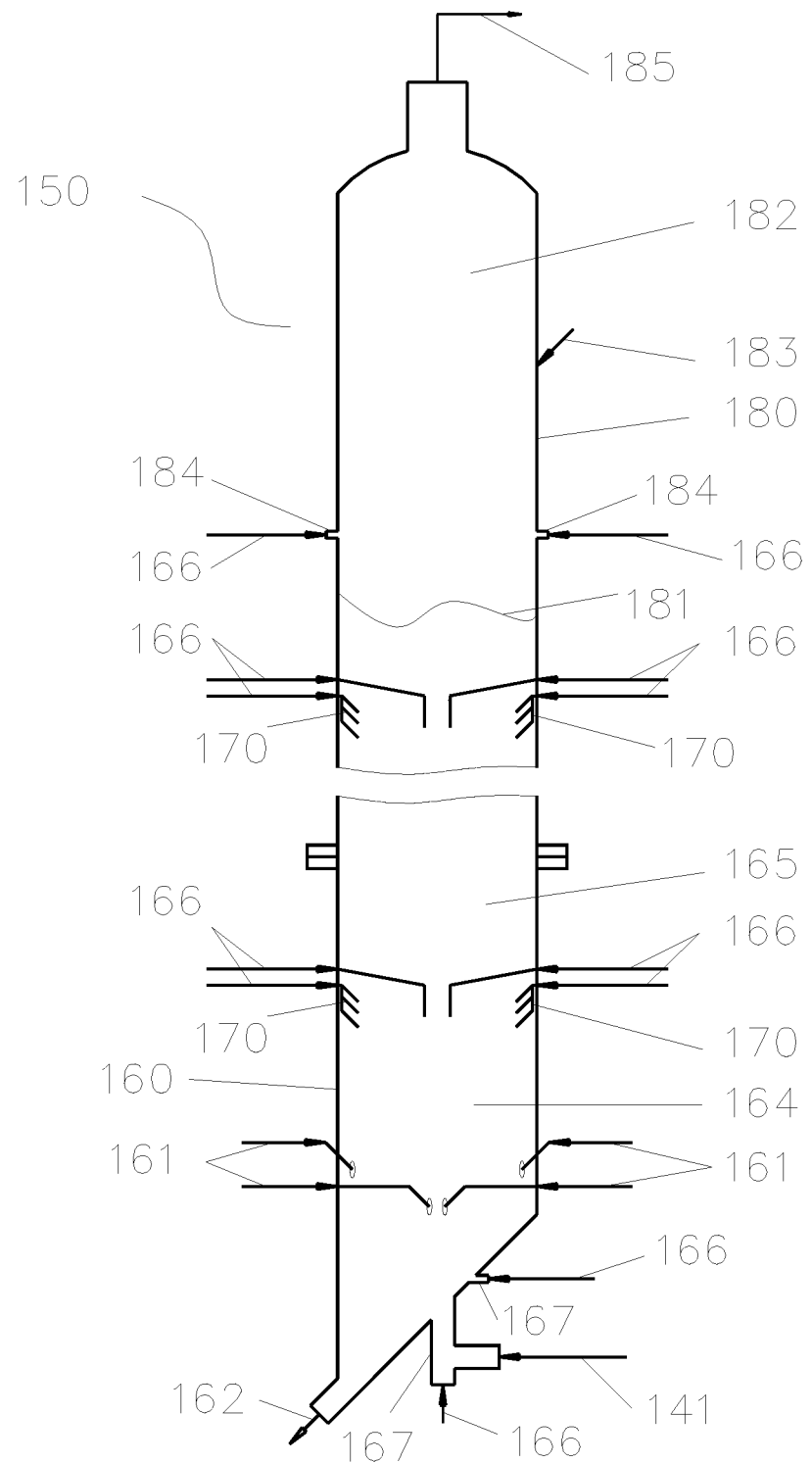
FIG. 3 is a schematic embodiment of the high temperature second stage fluidized bed gasifier.
Figure 4A:
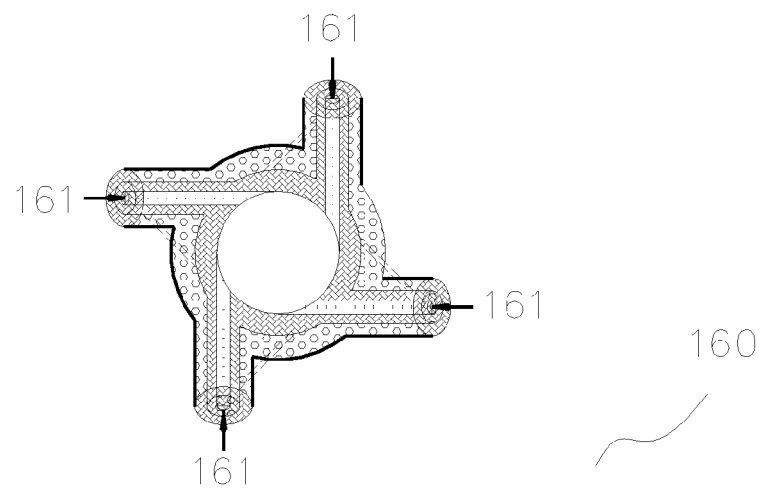
FIG. 4a is a partial cross-sectional view of the multiple downward inclined nozzles of an embodiment of the lower section of the second stage fluidized bed gasifier, wherein a lengthwise cross-sectional view is shown in FIG. 4b.
Figure 4B:
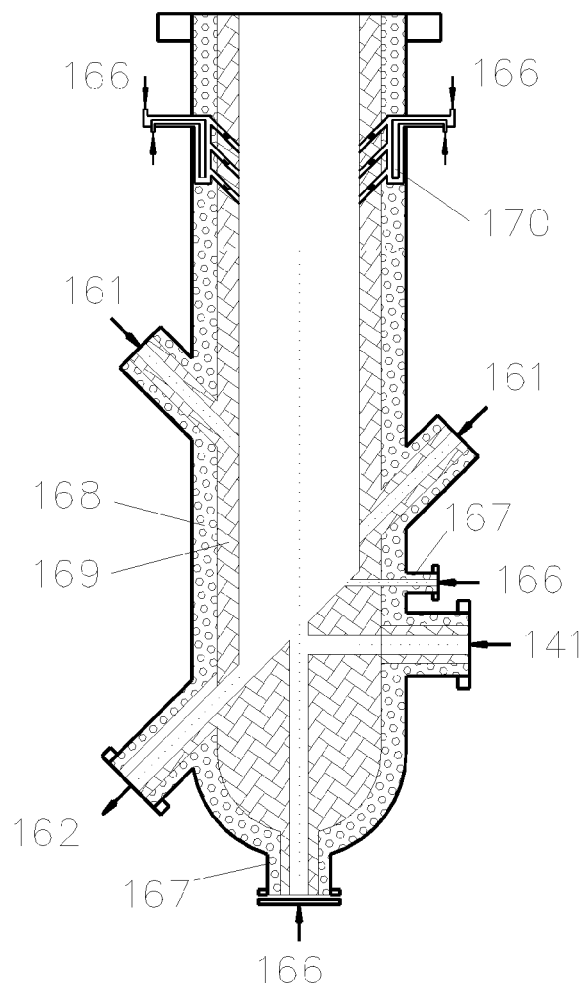
Figure 5:
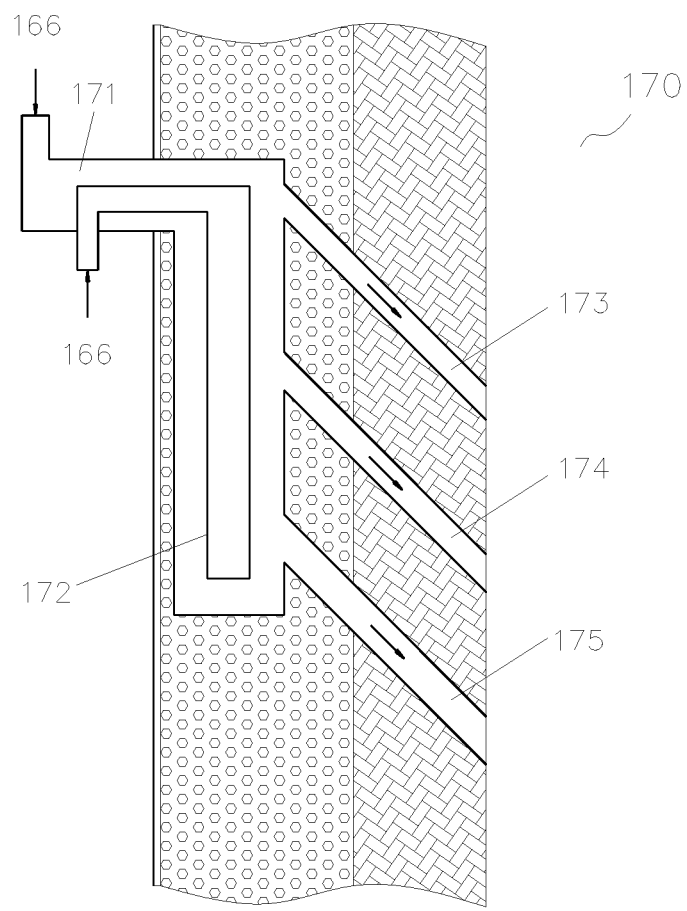
FIG. 5 is an embodiment of oxidant and steam distribution nozzle that is located in the fluid bed section of the second stage gasifier.

Details of the second stage gasifier are shown in FIGS. 3-5. Referring specifically to FIGS. 3, 4a, and 4b, the syngas stream 161 enters the second stage gasifier tangentially through multiple downward inclined nozzles located at different elevations in the lower section 160 of the gasifier. The temperature in the lower portion of the gasifier is maintained in the range of approximately 50 to 100° C. lower than the ash fusion temperature with additional oxidant and steam injection at different elevations through streams 166 and 167. As the finer char entering the second stage gasifier has a large surface area and is at the exit temperature of the first stage gasifier (which is typically approximately 1000° C. for a low reactivity bituminous coal), the char fines are rapidly heated to a higher operating temperature of the second stage gasifier that is in the range of approximately 1100 to 1400° C. A major portion of char fines are partially oxidized to gaseous products. Substantial amounts of tar entering the second stage gasifier are converted to gaseous products.

The second stage gasifier bed material comprises inert solid particles, such as silica sand or alumina in the size range of approximately 100 to 200 microns. The finer ash particles that enter the second stage gasifier along with the syngas from the first stage gasifier typically has a mass mean diameter of approximately 10 microns with a top size generally approximately 50 microns. Such finer ash particles pass through the second stage gasifier bed material, entrained by the syngas flow, and eventually leaves the second stage gasification unit through stream 121 (FIG. 2) for eventual capture by a downstream dust filtration unit.

Due to the operation at elevated temperatures and entrainment of unconverted carbon to freeboard region 182 above the fluidized bed level 181 in the upper section 180 of the second stage gasifier shown in FIG. 3, the overall carbon content in the bed will be less than approximately 1% by weight, more preferably less than approximately 0.5% by weight. Such a low carbon content uniformly distributed in the bed minimizes/avoids clinker formation that may occur at high operating temperatures. Further, oxidant and steam injection with stream 166 through nozzle 184 in the freeboard region while maintaining the temperature in the range of approximately 50° C. to 100° C. above the bed temperature as necessary to achieve approximately at least 95% overall carbon conversion, converts nearly all remaining tar and fine char particles in the syngas to useful syngas components. Such oxidant and steam injection in the freeboard region is especially useful for fuels with much lower reactivity.

The lower section of the second stage gasifier 160 shown in FIGS. 3, 4a, and 4b has tangential syngas inlet nozzles 161 at two different elevations at 90 degree orientations with the main oxidant and steam mixture stream 166 injected through distributor assemblies 170 located just above the syngas inlet nozzles at different orientations. To increase carbon conversion and more evenly distribute the oxidant and steam mixture, additional distributor assemblies 170 are located at a higher elevation in the bed as shown in FIG. 3. Referring to FIG. 5, each distributor assembly 170 comprises multiple ports, 173, 174, and 175, through which the oxidant and steam mixture stream 166 can be injected into the gasifier and distributed. The ports 173-175 are imbedded in the refractory. Stream 166 flows through an inner pipe 172 as well as through a surrounding pipe 171. Bulk of the stream 166 flow to the ports is through the outer pipe 171 with a small purge flow through inner pipe 172. In case the outer pipe 171 accumulates bed solids during an abnormal event and tend to plug the ports, the flow through inner pipe 172 can be reversed while maintaining gas flow through the outer pipe 171. Such a method provides a means to remove accumulated solids and ensures that the gas flow is maintained through the ports. Both the inner and outer pipes of the distributor assembly are imbedded in the insulating refractory which protects the pipe material from high gasifier temperatures.

The nozzle and oxidant and steam mixture injection arrangement disclosed in FIG. 5 reduces the number of nozzles penetrating the vessel shell while at the same time achieves the goal of distributing the oxidant and steam mixture stream through many ports. Such distribution is critical to minimize/avoid clinker formation due to local hot spots with excess oxidant concentration. Further, the distribution arrangement significantly improves refractory integrity and reduces fabrication costs. Although only three ports in communication with the distributor assembly 170 are shown in FIG. 5, those of skill in the art of fluidization will know to add or subtract the number of ports in each distributor assembly to achieve a desired degree of gas distribution. With an increase in gasifier capacity, the number of gas distributor assemblies 170 will increase, and the number of ports (such as 173-175 in each assembly) will also increase.

Those of skill in the art of distribution of gas into fluidized bed will appreciate the advantages of an exemplary gas distributor assembly shown in FIG. 5. Large scale conventional fluidized beds rely on various types of distribution grid arrangement in the lower section of the bed that are subjected to operating conditions of the fluidized bed. In U.S. Pat. No. 4,429,471, for example, a variation of bubble cap type gas distributor has been disclosed. It is clear that these types of distributors cannot be used in the second stage gasifier of the present invention as materials of construction cannot be exposed to the operating temperatures in the range of approximately 1100° C. to 1400° C. for extended periods. Another commonly used distributor includes a plenum with a plate to separate the bed from the plenum as disclosed in U.S. Pat. No. 5,014,632. In spite of various efforts to prevent bed solids from leaking into the plenum, leaking is nonetheless prevalent as the plenum pressure is uniform everywhere and the fluidized bed pressure across a given cross-section above the distributor plate varies considerably. As the center of the bed is at a slightly lower pressure than the wall region, the solids leak into the plenum from nozzles near the wall region. U.S. Pat. No. 4,532,108 discloses a method of installing the injection nozzles inside refractory. Such nozzles are prone to leak solids as all the nozzles face upwards. Any upsets in flow or a trip will cause the solids to leak and fill the nozzle. The plugged nozzles, with high solids temperature, tend to dilapidate.

In contrast, the distributor assembly 170 of FIG. 5 minimizes plugging potential as the ports 173-175 off the distributor assembly are all downwardly inclined, and gravity will make it difficult for solids to flow up. In addition, the gas pressure in inner smaller diameter pipe 172 can be much higher than in outer pipe 171. The independent gas supplies ensure that the pressure in the concentric pipes will be substantially higher than the gasifier pressure. Additional ports can be added as necessary depending upon the size and capacity of the gasifier. With additional ports, as the internal pressure in the gasifier varies with elevation, the port diameters can be sized to provide constant gas velocity through all the ports.

The lower section of the gasifier 160 shown in FIGS. 3-4 also has a central and an additional oxidant and steam mixture stream 166 injection nozzles 167 below the lower elevation of syngas inlet nozzles to ensure partial oxidation of any residual char carbon near the solids drain nozzle. Although only one nozzle 167 is shown entering the gasifier horizontally, one skilled in the art will understand that multiple 167 nozzles can be installed on the inclined lower section of the gasifier at different elevations and orientations. The oxidant and steam gas mixture injection into the bed through such nozzles and the central nozzle and in combination with a number of gas distributor assembly 170 at upper elevations of the gasifier ensure that oxidant and steam are uniformly distributed throughout the bed.

In a preferred embodiment, the atmosphere in the inclined lower section of the gasifier is slightly oxygen-rich to ensure low carbon content in the bottom ash discharged through stream 162. Excess bed material, agglomerated solids or larger particles due to condensation of fine molten ash droplets and subsequent reaction with bed materials are withdrawn as stream 162. Due to the well aerated fluidized bed, such larger particles sink and accumulate near the bottom drain, and the solids drain is further facilitated by the inclined refractory section. Further, to prevent bed material from being drained, the throat of the discharge nozzle can be aerated at a throat velocity of approximately in the range from 15 to 35 ft/s. The gasifier is shown having two layers of refractory 168 and 169. Layer 168 insulates the carbon steel shell from high gasifier temperature. The carbon steel shell is maintained in the temperature range of approximately 120 to 150° C. to minimize/prevent acid dew condensation and associated corrosion. As the insulating layer 168 is soft, it is protected with an erosion resistant refractory layer 169.

The recycle solids from the cyclone dipleg 130 and non-mechanical L-valve 140 enter the second stage gasifier as stream 141 and mix with the bed material through a central jet (FIG. 4). As the recycle solids are essentially the bed material without any char carbon, the L-leg 140 in FIG. 2 can be aerated with an oxidant and steam mixture to aid solids flow into the gasifier.

In addition to sufficient internal turbulent mixing of the bed in region 164 due to tangential inlet of syngas feed streams, the recycle solids stream through 140 and oxidant and steam mixture injection through nozzles 167 in lower inclined section of the gasifier, a fluidized bed level in the range of approximately 10 to 15 feet is maintained to provide the residence times necessary to partially oxidize a substantial fraction of char that enters the second stage and also to promote char gasification reactions. The freeboard height above the solids level in the second stage gasifier is in the range of approximately 10 to 20 feet.

As the freeboard height is not sufficient for total disengagement of bed material from exiting syngas, a cyclone 120 as shown in FIG. 2 in the second stage gasification unit is provided to capture and recycle the small fraction of bed material that entrains with the syngas. At lower operating gas velocities in the range of approximately 3 to 6 ft/s, the ratio of bed material captured and recycled back to the inventory of solids in the second stage gasifier is typically in the range of approximately 0.2 to 0.7. This ratio is relatively small compared to a similar ratio of over 100 in the first stage transport gasifier that relies on large solids circulation rates for gasification at relatively lower operating temperatures. The addition of the second stage cyclone 120 significantly decreases the disengagement height and thus the overall height of the second stage gasifier, and provides a means to maintain the solids inventory in the system. The fine ash and unconverted char carbon in the inlet stream to the cyclone exit the cyclone along with the syngas for cooling and filtration in downstream units.

Desired temperature and temperature profiles along the elevation in regions 164, 165, and 182 of the second stage gasifier 150 of FIG. 3 can be maintained by controlling the amount of oxidant and steam mixture 166 that enters through nozzles 167 in the drain section, distributor assemblies 170 in the lower and upper bed sections, and nozzles 184 in the freeboard region of the gasifier. If the oxidant requirements are low for any one section of the gasifier compared to other sections, the steam-to-oxygen ratio in the gas stream for that section can be increased to maintain a constant gas velocity through the nozzle (or port). The oxidant and steam mixture flow is less than approximately 10% compared to the syngas flow through the gasifier. As a result, fluidization and turbulent mixing of the bed material are accomplished with the syngas stream 161 that enters the gasifier. The distribution of oxidant and steam mixture through nozzles and ports in different regions of the gasifier, less than approximately 1% by weight residual char carbon content in the bed, less than approximately 5% by weight of fine ash content in the bed and turbulent mixing of the bed by the syngas stream that enters the gasifier prevents clinker formation even with the fluidized bed operating in the range of approximately 1100 to 1400° C.

The syngas stream that enters the second stage gasifier 150 of FIG. 3 at approximately 800 to 1100° C. comprises carbon monoxide, hydrogen, carbon dioxide, moisture and methane as major constituents. Significant amounts of carbon are present in the syngas as tar in vapor form and char carbon in solid form. The char and tar component fractions need to be converted into useful syngas components. Such conversions are only feasible at elevated operating temperatures in the range of approximately 1100 to 1400° C. By injecting oxidant and steam mixture stream 166 in the second stage gasifier at various locations, the syngas temperature is increased to a desired elevated operating temperature through partial oxidation of char and tar components, and also through oxidation of a small fraction of syngas components. The elevated operating temperature in the range of approximately 1100 to 1400° C. significantly promotes thermal cracking of tar and char gasification reactions and steam reforming of hydrocarbons resulting from tar cracking. With faster kinetics due to elevated temperatures, the partial oxidation, cracking, gasification and reforming reactions produce much more useful syngas components than that initially consumed through oxidation to attain higher operating temperatures. The elevated temperature operation also decreases methane fraction in the syngas through steam reforming. Irrespective of various reactions in the gasifier, the syngas composition at the exit of the second stage gasification unit easily can be determined by material and energy balances and shift reaction equilibrium. Thus, over approximately 95% of carbon in the feed fuel to the first stage is converted to useful syngas components.

Sorbent material such as limestone or dolomite can be injected through stream 183 in the freeboard region 182 of the second stage gasifier. If an ash mineral that is present in a significant amount can cause fouling, such as iron, then sufficient amounts of limestone or dolomite can be added to decrease the iron-to-calcium ratio to below approximately 0.3 to minimize fouling tendencies. The limestone sorbent also partially captures sulfur components in the syngas, and such capture reduces both capital and operating energy costs of downstream acid gas cleanup unit.

Other sorbents such as kaolin can be added through stream 183 to react with fouling ash minerals sodium and potassium when these minerals are present in significant amounts in coal ash.

To achieve higher char carbon and tar conversions, the freeboard region 182 temperature is at least approximately 50° C. above the bed temperature regardless of the ash fusion temperature. Operations at such high temperatures tend to form a small fraction of fine molten ash droplets due to local temperature variations. Sorbent injection stream 183 can capture a part of the fine molten ash droplets through condensation, reaction and solidification.

As the freeboard region may need to operate near or above the ash fusion temperature for low reactivity fuels to achieve over approximately 95% overall carbon conversion, fine molten ash droplets may entrain with the syngas exiting the second stage gasifier as stream 185 of FIG. 3. With the STD 110 in the second stage gasification unit process in FIG. 2, the fine molten ash droplets will condense and solidify on the relatively cooler internally circulating particles in the STD cooler. The STD cooler cools the syngas in the range of approximately 100 to 150° C. depending upon the coal ash initial softening temperature, and limits/prevents further ash particle softening and sticking to the cyclone wall. The STD cooler increases the performance of downstream multistage syngas cooler with the elimination of fouling softened ash particles. If desired, with additional heat transfer surfaces in STD cooler, the cooling load on the downstream multistage syngas cooler can be reduced.

The syngas stream 185 with entrained fines exiting from the upper portion of the second stage gasifier 150 enters the STD cooler 110 through an L-leg arrangement 111 with the syngas jetting into the cooler to form a spouted bed. Such inlet L-leg arrangement at the bottom of the cooler maintains the bed level 199 and solids inventory in the cooler during a trip or shutdown.

As shown in FIG. 2, the STD cooler has heat transfer surfaces 113 that stay in contact with refluxing solids from spouted jet action. This minimizes/eliminates not only erosion of heat transfer surfaces but also fouling as the cooler tubes does not come in direct contact with syngas. As the STD cooler lowers the syngas temperature in the range of approximately 100 to 150° C., such cooling is accomplished with minimum heat transfer surfaces 113 with cooling water stream 114. The STD cooler also has an inverted hat arrangement 115 that minimizes entrainment of bed solids through inertial separation.

With condensation and solidification of fine molten ash droplets on the bed material, the internally circulating larger particles or excessive bed material can be removed periodically or continuously from the cooler through stream 117 to second stage gasifier by another L-leg arrangement. The flow of particles as stream 117, as necessary, is facilitated by aerating the solids stream with inert gas 118. The particles stream 117 is mixed with the solids from the cyclone dipleg 130 and recycled back to the gasifier through 140 L-leg. As some of the condensed ash particles on the bed material are loosely bound, the loose agglomerate can be attrited in either the second stage gasifier or the STD cooler, with the fine ash exiting the cooler along with the syngas through stream 112. Remaining larger unattrited particles can be discharged from the second stage gasifier through stream 162.

The bed level 119 and solids inventory in the STD cooler is maintained by adding make-up bed material, as necessary, through stream 116 as shown in FIG. 2. The solids inventory in the second stage gasifier 150 also can be maintained, as necessary, by adding the make-up bed material through stream 116 to STD cooler and moving the excess solids in the STD cooler to the second stage gasifier through stream 117 to cyclone dipleg 130 and by aerating the solids in the L-leg 140. With the addition of make-up bed material through stream 116, removal of larger particles through drain 162 and the shifting of excess inventory from one vessel to another, the bed material inventories easily can be maintained in both the gasifier and STD cooler as they are interconnected through 111, 117 and the cyclone 120 and its dipleg 130.

The STD cooler 110 tempers the incoming syngas and the entrained materials stream 185 temperature in the range of approximately 100 to 150° C. that is sufficient to condense and solidify any fine molten ash droplets in the syngas stream that enters the cooler. The syngas stream 112 exiting the STD cooler entrains a small portion of the bed material along with fine ash and any remaining unconverted char carbon. As the bed material fraction in the syngas is much coarser than the fine ash and any unconverted char carbon, the second stage cyclone 120 of FIG. 2 captures the coarser fraction and recycles the solids back to the second stage gasifier 150 through the dipleg 130 and L-leg 140. As the ratio of coarser solids captured and recycled back to the inventory of solids in the gasifier 150 is small, the recycle of approximately 100 to 150° C. cooler entrained solids essentially does not affect the bed temperature in the gasifier.

The second stage fluidized bed gasifier 150 shown in FIG. 2 essentially can be a stationary turbulent fluidized bed or with substantial solids circulation depending upon the superficial gas velocity in the gasifier. The inclusion of second stage cyclone 120 decreases the overall height of the second stage gasifier 150 to less than approximately 40 feet with from approximately 10 to 15 feet of bed material and from approximately 15 to 20 feet of freeboard region. Without the second stage cyclone in the embodiment, the overall height of the gasifier will be much more as the freeboard region needs to be much taller to achieve total disengagement of bed material from exiting syngas and thus maintain the bed material inventory in the gasifier.

By incorporating the multistage fluidized bed syngas cooler in the integrated process of SGIP flow scheme of FIG. 1, the cooler can handle syngas at temperatures higher than approximately 1000° C., overcoming the limitations of fire tube heat exchanger as the syngas do not come in direct contact with heat transfer surfaces. In the SGIP flow scheme illustrated in FIG. 1, the syngas from the cooler in the range of approximately 250 to 400° C. flows to a 'cold' third stage cyclone (the term 'cold' here refers to equipment and processes downstream of multistage syngas cooler, and the term 'hot' will refer to upstream of the cooler; the first and second stage cyclones are respectively configured with the first stage circulating fluidized bed transport gasifier loop and the second stage gasification unit). The efficiency of the third cyclone operating at relatively cooler temperatures is much higher than 'hot' cyclones. When necessary, the fine solids stream from the third stage cyclone can be recycled back to the inlet of the second stage gasifier to achieve desired overall carbon conversion. To avoid accumulation of fines in the process, a purge stream discharges cyclone fines and combines the discharge stream with the PCD fines for cooling and depressurization before final disposal.

The second stage gasification unit and the SGIP flow scheme can operate in air-, enriched air-, and oxygen-blown modes. Air-blown and enriched air-blown modes are advantageous for power generation. Large power generation units up to approximately 600 MWe that consume on the order of 5000 tons/day of bituminous coal, can be shop-built and transported to site for installation and operation at higher pressures without the necessity of multiple, parallel first- and second-stage gasifiers.

The second stage gasification unit disclosed and the SGIP flow scheme can operate in an oxygen-blown mode to generate syngas for downstream synthesis into a number of different chemicals including polymers. The addition of second stage gasification unit to improve carbon conversion has particular advantaged compared to other gasification processes as the oxygen consumption is low, in the range of approximately 350 to 400 standard cubic meters (scm) per 1000 scm of carbon monoxide and hydrogen produced from low reactivity bituminous coal gasification. The coal consumption is also lower, in the range of approximately 500 to 550 kg of dry coal per 1000 scm of carbon monoxide and hydrogen produced. The lower heating value is in the range of approximately 8.5 to 10 MJ/scm of syngas with low steam consumption in the range of approximately 0.25 to 0.35 steam-to-coal mass ratio. Besides lower carbon conversion, typical fluidized bed gasifiers produce significant amounts of methane as they are limited in operating temperature. Methane is not useful for synthesizing chemicals from carbon monoxide and hydrogen. Due to higher operating temperatures of the present second stage gasifier, the methane content of the syngas is low—in the range of approximately 0.25 to 0.5 mole percent.

The second stage gasification unit of FIG. 2 and the SGIP flow scheme of FIG. 1 can operate over a wide range of pressures, in the range of approximately 30 to 1000 psia depending upon the carbonaceous source material and downstream process requirements. The second stage gasification unit and the integrated process are primarily described with low reactivity bituminous coal as feed material. To gasify other feedstock materials, and to operate with other operation modes with air, enriched air and oxygen, one of skill in the art can choose appropriate gasifier configurations and conditions for operation within the spirit of the integrated process scheme disclosed.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A process of conditioning a first stage syngas stream containing unwanted species in a first stage concentration formed by a first stage gasification unit of an integrated gasification process for low reactivity fuels, the process comprising:
converting the first stage syngas stream containing the unwanted species in the first stage concentration into a second stage syngas stream containing the unwanted species in a second stage concentration in a high temperature second stage turbulent fluidized bed gasifier having operating characteristics, wherein a first operating characteristic of the second stage gasifier is operating the second stage turbulent fluidized bed gasifier in the range of approximately 1100 to 1400° C., the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species;
tempering the second stage syngas stream temperature containing the unwanted species in the second stage concentration in a syngas temperament device (STD); and
returning at least a portion of bed material from the second stage turbulent fluidized bed gasifier flowing through the STD to the second stage turbulent fluidized bed gasifier;
wherein the process achieves over approximately 95% carbon conversion into syngas gasifying low reactivity fuels comprising carbonaceous materials with ash content up to approximately 45 wt %.

2. The process of claim 1, wherein tempering the second stage syngas stream in the STD comprises cooling the second stage syngas stream by approximately 100 to 150° C.

3. The process of claim 1 further comprising introducing an oxidant in the bed material region of the second stage turbulent fluidized bed gasifier.

4. The process of claim 1 further comprising introducing a steam mixture stream in the bed material region of the second stage turbulent fluidized bed gasifier.

5. The process of claim 1 further comprising introducing an oxidant and a steam mixture stream in the bed material region of the second stage turbulent fluidized bed gasifier.

6. The process of claim 1 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

7. The process of claim 1, wherein the height of the bed material region is in the range of approximately 10 to 15 feet, and the height of the freeboard region is in the range of approximately 10 to 20 feet.

8. The process of claim 1, the process generating up to 600 MWe.

9. The process of claim 1 further comprising introducing the first stage syngas stream into the second stage turbulent fluidized bed gasifier tangentially at different elevations of the second stage turbulent fluidized bed gasifier.

10. The process of claim 1 further comprising introducing at least one sorbent in the freeboard region of the second stage turbulent fluidized bed gasifier.

11. The process of claim 1 further comprising forming a center jet in the STD with the second stage syngas stream.

12. The process of claim 1, wherein the first stage syngas stream comprises fine entrained particles in the range of approximately 0 to 50 microns, and upon char carbon conversion in the bed material of the second stage turbulent fluidized bed gasifier and entrainment of unconverted char carbon and finer ash particles from the bed material into the freeboard region of the second stage turbulent fluidized bed gasifier, the bed material contains less than approximately 1 wt % of char carbon and less than approximately 5 wt % of fine ash.

13. The process of claim 1 further comprising operating the second stage turbulent fluidized bed gasifier approximately 50° C. to 100° C. below the ash fusion temperature of ash and having a bed material temperature of up to approximately 1400° C.

14. The process of claim 1, wherein the second stage syngas stream is tar-free and has a methane content in the range of approximately 0.25 to 0.5 mole %.

15. The process of claim 1 further comprising operating the second stage turbulent fluidized bed gasifier with a gas superficial velocity range between approximately 3 to 12 ft/s.

16. The process of claim 1 further comprising operating the second stage turbulent fluidized bed gasifier within a pressure range between approximately 30 to 1000 psia.

17. The process of claim 1, wherein the unwanted species comprises char carbon.

18. The process of claim 1, wherein the unwanted species comprises tar.

19. The process of claim 1, wherein the unwanted species comprises ash fines.

20. A process of conditioning a first stage syngas stream containing unwanted species in a first stage concentration formed by a first stage gasification unit of an integrated gasification process for low reactivity fuels, the process comprising:
converting the first stage syngas stream containing the unwanted species in the first stage concentration into a second stage syngas stream containing the unwanted species in a second stage concentration in a high temperature second stage turbulent fluidized bed gasifier having operating characteristics, wherein a first operating characteristic of the second stage gasifier is operating the second stage turbulent fluidized bed gasifier in the range of approximately 1100 to 1400° C., the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species;
tempering the second stage syngas stream temperature containing the unwanted species in the second stage concentration in a syngas temperament device (STD); and
returning at least a portion of bed material from the second stage turbulent fluidized bed gasifier flowing through the STD to the second stage turbulent fluidized bed gasifier;
wherein the process achieves over approximately 95% carbon conversion into syngas gasifying low reactivity fuels comprising carbonaceous materials.

21. The process of claim 20 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

22. A process of conditioning a first stage syngas stream containing unwanted species in a first stage concentration formed by a first stage gasification unit of an integrated gasification process for low reactivity fuels, the process comprising:
converting the first stage syngas stream containing the unwanted species in the first stage concentration into a second stage syngas stream containing the unwanted species in a second stage concentration in a high temperature second stage turbulent fluidized bed gasifier having operating characteristics, wherein a first operating characteristic of the second stage gasifier is operating the second stage turbulent fluidized bed gasifier in the range of approximately 1100 to 1400° C., the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species;
tempering the second stage syngas stream temperature containing the unwanted species in the second stage concentration in a syngas temperament device (STD); and
returning at least a portion of bed material from the second stage turbulent fluidized bed gasifier flowing through the STD to the second stage turbulent fluidized bed gasifier;
wherein the process achieves over approximately 98% carbon conversion into syngas gasifying low reactivity fuels comprising low reactivity bituminous coals.

23. The process of claim 22 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

24. A process of conditioning a first stage syngas stream containing unwanted species in a first stage concentration formed by a first stage gasification unit of an integrated gasification process for low reactivity fuels, the process comprising:
converting the first stage syngas stream containing the unwanted species in the first stage concentration into a second stage syngas stream containing the unwanted species in a second stage concentration in a high temperature second stage turbulent fluidized bed gasifier having operating characteristics, wherein a first operating characteristic of the second stage gasifier is operating the second stage turbulent fluidized bed gasifier in the range of approximately 1100 to 1400° C., the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species;
tempering the second stage syngas stream temperature containing the unwanted species in the second stage concentration in a syngas temperament device (STD);
returning at least a portion of bed material from the second stage turbulent fluidized bed gasifier flowing through the STD to the second stage turbulent fluidized bed gasifier; and
operating the second stage turbulent fluidized bed gasifier in a second operating characteristic comprising a superficial velocity range of between approximately 3 to 12 ft/s.

25. The process of claim 24 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

26. The process of claim 24, wherein tempering the second stage syngas stream in the STD comprises cooling the second stage syngas stream by approximately 100 to 150° C.

27. The process of claim 24 further comprising introducing an oxidant in the bed material region of the second stage turbulent fluidized bed gasifier.

28. The process of claim 24 further comprising introducing a steam mixture stream in the bed material region of the second stage turbulent fluidized bed gasifier.

29. The process of claim 24 further comprising introducing an oxidant and a steam mixture stream in the bed material region of the second stage turbulent fluidized bed gasifier.

30. The process of claim 24 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

31. The process of claim 24, wherein the height of the bed material region is in the range of approximately 10 to 15 feet, and the height of the freeboard region is in the range of approximately 10 to 20 feet.

32. The process of claim 24, the process generating up to 600 MWe.

33. The process of claim 24 further comprising introducing the first stage syngas stream into the second stage turbulent fluidized bed gasifier tangentially at different elevations of the second stage turbulent fluidized bed gasifier.

34. The process of claim 24 further comprising introducing at least one sorbent in the freeboard region of the second stage turbulent fluidized bed gasifier.

35. The process of claim 24 further comprising forming a center jet in the STD with the second stage syngas stream.

36. A process of conditioning a first stage syngas stream containing unwanted species in a first stage concentration formed by a first stage gasification unit of an integrated gasification process for low reactivity fuels, the process comprising:
converting the first stage syngas stream containing the unwanted species in the first stage concentration into a second stage syngas stream containing the unwanted species in a second stage concentration in a high temperature second stage turbulent fluidized bed gasifier having operating characteristics, wherein a first operating characteristic of the second stage gasifier is operating the second stage turbulent fluidized bed gasifier in the range of approximately 1100 to 1400° C., the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species;

tempering the second stage syngas stream temperature containing the unwanted species in the second stage concentration in a syngas temperament device (STD);

returning at least a portion of bed material from the second stage turbulent fluidized bed gasifier flowing through the STD to the second stage turbulent fluidized bed gasifier; and operating the second stage turbulent fluidized bed gasifier in a third operating characteristic comprising a pressure range of between approximately 30 to 1000 psia.

37. The process of claim 36 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

38. The process of claim 36, wherein tempering the second stage syngas stream in the STD comprises cooling the second stage syngas stream by approximately 100 to 150° C.

39. The process of claim 36 further comprising introducing an oxidant in the bed material region of the second stage turbulent fluidized bed gasifier.

40. The process of claim 36 further comprising introducing a steam mixture stream in the bed material region of the second stage turbulent fluidized bed gasifier.

41. The process of claim 36 further comprising introducing an oxidant and a steam mixture stream in the bed material region of the second stage turbulent fluidized bed gasifier.

42. The process of claim 36 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

43. The process of claim 36, wherein the height of the bed material region is in the range of approximately 10 to 15 feet, and the height of the freeboard region is in the range of approximately 10 to 20 feet.

44. The process of claim 36, the process generating up to 600 MWe.

45. The process of claim 36 further comprising introducing the first stage syngas stream into the second stage turbulent fluidized bed gasifier tangentially at different elevations of the second stage turbulent fluidized bed gasifier.

46. The process of claim 36 further comprising introducing at least one sorbent in the freeboard region of the second stage turbulent fluidized bed gasifier.

47. The process of claim 36 further comprising forming a center jet in the STD with the second stage syngas stream.

48. A process of conditioning a first stage syngas stream containing unwanted species in a first stage concentration formed by a first stage gasification unit of an integrated gasification process for low reactivity fuels, the process comprising:

converting the first stage syngas stream containing the unwanted species in the first stage concentration into a second stage syngas stream containing the unwanted species in a second stage concentration in a high temperature second stage turbulent fluidized bed gasifier, the second stage turbulent fluidized bed gasifier including bed material in a bed material region, a freeboard region above the bed material region, and an outlet for the second stage syngas stream containing the unwanted species in the second stage concentration, the second stage concentration of the unwanted species lower than the first stage concentration of the unwanted species;

operating the high temperature second stage turbulent fluidized bed gasifier in the range of approximately 1100 to 1400° C.;

operating the high temperature second stage turbulent fluidized bed gasifier with a superficial velocity range of between approximately 3 to 12 ft/s;

operating the high temperature second stage turbulent fluidized bed gasifier in the range of between approximately 30 to 1000 psia;

tempering the second stage syngas stream temperature containing the unwanted species in the second stage concentration in a syngas temperament device (STD); and returning at least a portion of bed material from the second stage turbulent fluidized bed gasifier flowing through the STD to the second stage turbulent fluidized bed gasifier;

wherein the process achieves over approximately 95% carbon conversion into syngas gasifying low reactivity fuels.

49. The process of claim 48 further comprising introducing an oxidant and a steam mixture stream in the bed material region of the second stage turbulent fluidized bed gasifier via a distributor assembly embedded in a refractory layer of the bed material region of the second stage turbulent fluidized bed gasifier.

50. A process for generating syngas from low reactivity fuels comprising:

combining in a first unit low reactivity fuels and oxidant to produce a first stage syngas stream containing unwanted species in a first stage concentration;

converting in a second unit being a second stage turbulent fluidized bed gasifier having bed material the first stage syngas stream containing the unwanted species in the first stage concentration into a second stage syngas stream containing the unwanted species in a second stage concentration, the second stage concentration of the unwanted species lower than the first stage concentration of the unwanted species;

operating the second stage turbulent fluidized bed gasifier in the range of approximately 1100 to 1400° C.;

tempering the second stage syngas stream in a third unit to condense molten ash droplets; and returning at least a portion of bed material flowing through the third unit to the second unit.

51. The process of claim 50, wherein the process achieves over approximately 95% carbon conversion into syngas gasifying low reactivity fuels comprising carbonaceous materials with ash content up to approximately 45 wt %.

52. The process of claim 50, the process generating up to 600 MWe and comprising a single unit of second stage gasifier of transportable size.

53. The process of claim 50 further comprising introducing the first stage syngas stream into the second unit tangentially at different elevations of the second unit to form a well-mixed fluidized bed of the bed material that uniformly distributes the unwanted species among the bed material.

54. The process of claim 50 further comprising introducing an oxidant and steam mixture stream into the second unit at different elevations of the second unit.

55. The process of claim 50 further comprising introducing at least one sorbent in a freeboard region of the second stage turbulent fluidized bed gasifier to minimize fouling problems associated with certain ash minerals.

56. The process of claim 50 further comprising forming a center jet in the third unit with the second stage syngas stream;
  wherein the third unit comprises a syngas temperament device (STD).

57. The process of claim 50, wherein the first stage syngas stream comprises fine entrained particles in the range of approximately 0 to 50 microns, and upon char carbon conversion in the bed material of the second unit and entrainment of unconverted char carbon and finer ash particles from the bed material into a freeboard region of the second unit, the bed material contains less than approximately 1 wt % of char carbon and less than approximately 5 wt % of fine ash.

58. The process of claim 50 further comprising operating the second unit fluidized bed approximately 50° C. to 100° C. below the ash fusion temperature of the ash, having a bed material temperature of up to approximately 1400° C., and preventing agglomerate and clinker formation.

59. The process of claim 50, wherein the second stage syngas stream is tar-free and has a methane content in the range of approximately 0.25 to 0.5 mole %.

60. The process of claim 50, wherein for low reactivity bituminous coal gasification, the oxygen consumption is low and in the range of 350 to 400 scm per 1000 scm of carbon monoxide and hydrogen produced.

61. The process of claim 60, wherein for low reactivity bituminous coal gasification, the coal consumption is low and in the range of 500 to 550 kg of dry coal per 1000 scm of carbon monoxide and hydrogen produced.

62. The process of claim 61, wherein for low reactivity bituminous coal gasification, the steam consumption is low and in the range of 0.25 to 0.35 steam-to-coal mass ratio, and the lower heating value of the exiting syngas is in the range of 8.5 to 10 MJ/scm.

* * * * *